US012025431B2

(12) United States Patent
Shibusawa et al.

(10) Patent No.: US 12,025,431 B2
(45) Date of Patent: Jul. 2, 2024

(54) HEATING COOKER INCLUDING THREE DIMENSIONAL MEASURING DEVICE

(71) Applicant: Samsung Electronics Co., Ltd., Suwon-si (KR)

(72) Inventors: Eijiro Shibusawa, Yokohama (JP); Kazuo Shimizu, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 16/705,600

(22) Filed: Dec. 6, 2019

(65) Prior Publication Data

US 2020/0182610 A1 Jun. 11, 2020

(30) Foreign Application Priority Data

Dec. 6, 2018 (JP) ................................. 2018-228958
Aug. 8, 2019 (KR) ......................... 10-2019-0096739

(51) Int. Cl.
*G01B 11/25* (2006.01)
*F24C 7/08* (2006.01)
*G06T 7/579* (2017.01)
*G06T 17/00* (2006.01)

(52) U.S. Cl.
CPC ............ *G01B 11/2518* (2013.01); *F24C 7/08* (2013.01); *G06T 7/579* (2017.01); *G06T 17/00* (2013.01); *G06T 2207/10028* (2013.01)

(58) Field of Classification Search
None
See application file for complete search history.

(56) References Cited

U.S. PATENT DOCUMENTS

| 5,671,056 A | 9/1997 | Sato |
| 8,311,777 B2 | 11/2012 | Sugiura et al. |
| 2004/0104338 A1* | 6/2004 | Bennett ............. G01B 11/2518 250/234 |
| 2007/0291281 A1 | 12/2007 | Yamaguchi et al. |
| 2008/0099461 A1* | 5/2008 | Li ............................ F24C 7/06 219/402 |
| 2010/0128755 A1* | 5/2010 | Luckhardt ............ H05B 6/6455 374/134 |
| 2010/0131235 A1* | 5/2010 | Aoba ........................ G06T 7/70 356/615 |

(Continued)

FOREIGN PATENT DOCUMENTS

| CN | 105361968 A | 3/2016 |
| EP | 2511654 A1 | 10/2012 |

(Continued)

OTHER PUBLICATIONS

International Search Report in connection with International Application No. PCT/KR2019/015697 dated Mar. 16, 2020, 3 pages.

(Continued)

*Primary Examiner* — Elizabeth M Kerr

(57) ABSTRACT

A three dimensional (3D) measuring device. The 3D measuring device includes a rotational supporting shaft, a supporting frame configured to support the supporting shaft, a beam irradiator arranged at the supporting shaft for irradiating beam of light onto an object, a capturer arranged at the supporting shaft to be at a distance from the beam irradiator and configured to capture the beam projected on the object, and at least one processor configured to control rotation of the supporting shaft and obtain a 3D shape of the object based on image information obtained by the capturer as the supporting shaft is rotated.

8 Claims, 13 Drawing Sheets

(56) References Cited

U.S. PATENT DOCUMENTS

| | | | | |
|---|---|---|---|---|
| 2013/0076857 A1* | 3/2013 | Kurashige | ............... | G01B 11/25 348/40 |
| 2014/0268177 A1* | 9/2014 | Saito | .................. | G01B 11/2518 356/601 |
| 2015/0285513 A1 | 10/2015 | Matarazzi et al. | | |
| 2017/0066193 A1* | 3/2017 | Kim | ....................... | B29C 64/241 |
| 2017/0115008 A1* | 4/2017 | Erbe | ........................ | F24C 7/081 |
| 2017/0202483 A1* | 7/2017 | Sorimoto | ............. | A61B 5/4547 |
| 2019/0301858 A1* | 10/2019 | Margaria | ............. | A61B 5/0064 |

FOREIGN PATENT DOCUMENTS

| | | | |
|---|---|---|---|
| EP | 2930433 | A1 | 10/2015 |
| EP | 3346190 | A1 | 7/2018 |
| JP | H08-327337 | A | 12/1996 |
| JP | 5364861 | B1 | 12/2013 |
| JP | 2014-202414 | A | 10/2014 |
| KR | 10-2017-0028746 | A | 3/2017 |

OTHER PUBLICATIONS

Supplementary European Search Report dated Nov. 29, 2021, in connection with European Application No. 19892117.3, 9 pages.

European Patent Office, "Communication pursuant to Article 94(3) EPC," dated Apr. 26, 2023, in connection with European Patent Application No. 19892117.3, 5 pages.

Communication under Rule 71(3) EPC dated Nov. 2, 2023, in connection with European Patent Application No. 19892117.3, 35 pages.

\* cited by examiner

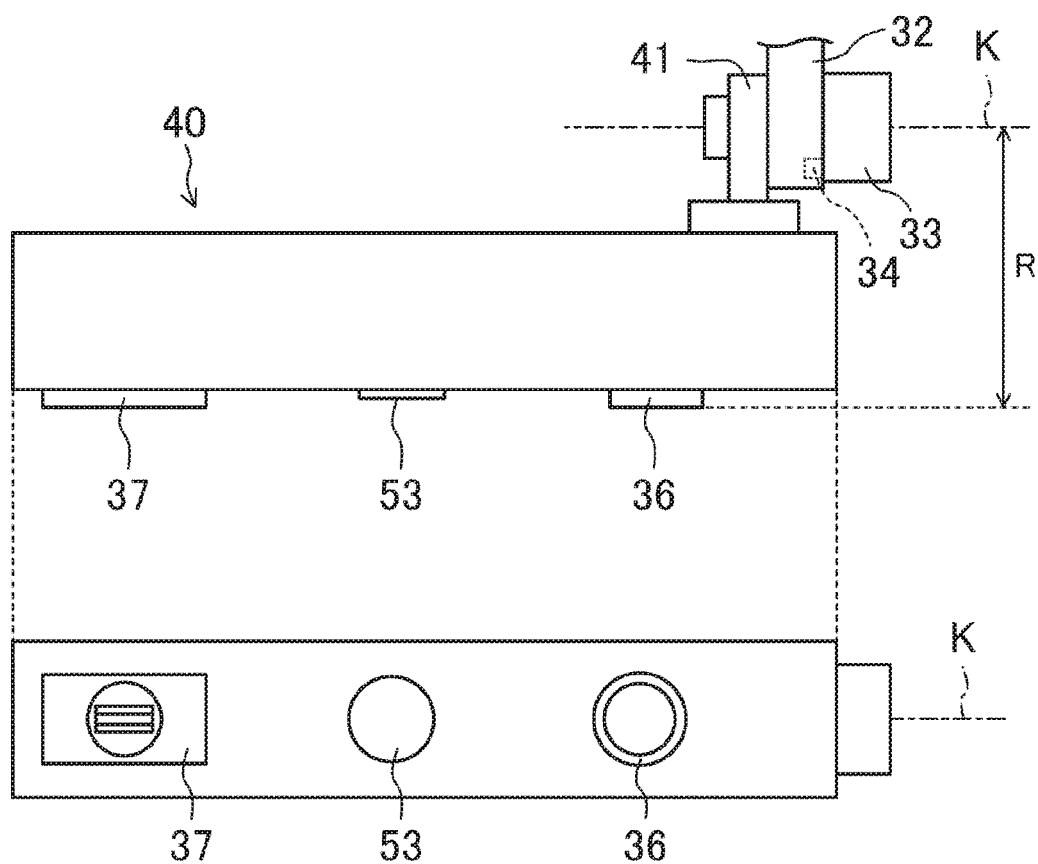

HEATING COOKER INCLUDING THREE DIMENSIONAL MEASURING DEVICE

CROSS-REFERENCE TO RELATED APPLICATION

This application is based on and claims priority under 35 U.S.C. § 119 to Japanese Patent Application No. 2018-228958 filed on Dec. 6, 2018 and Korean Patent Application No. 10-2019-0096739 filed on Aug. 8, 2019, the disclosures of which are incorporated herein by reference in its entirety.

BACKGROUND

1. Field

The disclosure relates to a heating cooker including a three dimensional measuring device.

2. Discussion of Related Art

An optical sectioning method is known as a technology for measuring a three dimensional (3D) shape. In the optical sectioning method, an object is scanned with beam in the form of a thin film commonly formed through a slit. Beam irradiated in the form of lines projected onto the object is then captured by a vertex camera. Based on the principle of triangulation, the depth of the object is calculated from image data of the irradiated beam.

To measure a three dimensional shape of the object, the entire object needs to be scanned, in which case, the beam scanning needs to be performed over a wider area than that of the object. For this, one of a light source and the object moves in parallel, or the light source fluctuates while facing the object (refer to patent document 1). There is also a method of rotating the beam in the form of a thin film by rotating the slit of the light source around an optical axis (refer to patent document 2).

In the method of fluctuating the light source as disclosed in the patent document 1, line beam in parallel with a direction (Y direction) orthogonal to the scanning direction (X direction) is irradiated from the light source. The center of capturing of the camera is placed at a distance from the light source in the X direction. The height of the line beam is measured based on the line beam projected on the object, an angle between the light source and the center of capturing of the camera, their positional relationship, etc.

The patent document 1 also discloses a method of swaying and irradiating sloped line beam from the Y direction as well as the line beam parallel to the Y direction.

Various heating cookers, such as ovens, microwaves, or oven ranges incorporating both functions of the oven and the microwave are commercially used these days. Many different automation technologies being introduced into the heating cookers save users trouble and give them convenience.

However, currently commercialized heating cookers have stayed at a level of giving assistance to the user who is cooking food by heating, but still are far from high-degree automation of cooking. Hence, various technologies have been introduced to further facilitate automation for cooking by heating.

For example, patent document 3 discloses a microwave including a weight sensor detecting the weight of food put in the heating room. The shape and thickness of the food, a container, etc., are captured by a camera, and the image is compared with what are stored in a database to specify the food. Based on specific heat and heat conductivity of the specified food, and the weight of the detected food, a cooking sequence is determined and then cooking by heating is performed based on the cooking sequence.

Food items such as steak, roast chicken, roast beef, etc., which have low process degrees, have various shapes or sizes. To prevent such food items from being half-cooked but make them tasty, heating temperature, time, timing, etc., needs to be finely adjusted based on the shape and size of the food item.

In this regard, the microwave as disclosed in the patent document 3 does not take the shape or size of the food item into account during the cooking process by heating. This may sometimes fail to cook the food item properly. Hence, measuring the three dimensional (3D) shape of the food item before cooking and reflecting the measurement result on the cooking is considered.

In the method as disclosed in the patent document 2, however, the size of the food item to be measured is limited to a range within which the beam spreads. In this case, it is difficult to measure a big sized object like the food item in relation to beam intensity, diffusion, etc.

Even in the method of moving the light source in parallel as disclosed in the patent document 1, when the object is large in size, it leads to an increase in size of equipment. Accordingly, it is practically difficult to use the method in measuring food items.

According to the method of swaying the light source in the patent document 1, there is no need to move the light source to a great extent even when the object is large. However, to secure an accuracy of measurement, the light source and the camera are required to be placed as far as possible, at predefined locations with high accuracy. Furthermore, when the object is large, the camera needs to capture the object at a wide angle, which may lead to significant distortion of the center and edge portions of the captured image, thereby degrading the measurement accuracy.

Moreover, when it comes to heating cookers, they are likely to be heated to high temperatures, requiring heat-resistance for the parts of the heating cookers. Also, there is a limited amount of room to install measuring equipment in the structure of the heating cooker. Further, because the heating cooker is a home appliance, it is difficult to commercialize a heating cooker with the measurement equipment when the equipment is expensive.

Accordingly, a main objective of the disclosure is to provide a low-cost compact 3D measuring device that may measure even a large object.

PRIOR ART LITERATURE

Patent Document 1: JP Patent Publication No. 2016-138761
Patent Document 2: JP Patent Publication No. 2002-310625
Patent Document 3: JP Patent Publication No. 11-63509

SUMMARY

The disclosure provides a three dimensional (3D) measuring device that may measure a 3D shape of an object.

According to an embodiment of the disclosure, a 3D measuring device includes a rotational supporting shaft, a supporting frame for supporting the supporting shaft, a beam irradiator arranged at the supporting shaft for irradiating beam of light onto an object, a capturer arranged at the supporting shaft to be at a distance from the beam irradiator for capturing the beam projected on the object, and at least one processor configured to control rotation of the supporting shaft and obtain a 3D shape of the object based on image information obtained by the capturer as the supporting shaft is rotated.

With the 3D measuring device according to an embodiment of the disclosure, a capturer and a beam irradiator are installed at preset locations on the same supporting shaft, so a positional relationship between the capturer and the beam irradiator may be maintained to be stable and accurate. For example, because the capturer and the beam irradiator are placed along the rotational axis of the supporting shaft, the positional relationship may be stably maintained even when the supporting shaft is rotated. The capturer and the beam irradiator may be placed at suitable locations.

It is possible to accurately measure the object because the locations of the capturer and the beam emitter may be easily determined with high accuracy. The capturer and the beam irradiator may be closely arranged so that the overall size of the measuring device may become small.

As the capturer is rotatable, the capturer may capture a wide range even with a narrow image angle. The capturer may capture a large object that goes beyond the image angle. The capturer may also suppress image distortion, so accurate measurement is possible.

The beam irradiator of the 3D measuring device may include a slit provided at an angle with the rotational axis of the supporting shaft for spreading the beam. Accordingly, the beam may have a plane shape that intersects the rotational axis of the supporting shaft and spreads at an angle. The beam irradiator and the capturer may be arranged such that a baseline connecting a center line of the beam irradiator and a center line of the capturer runs parallel to the rotational axis of the supporting shaft. Furthermore, the beam irradiator and the capturer may be arranged such that a baseline connecting the center line of the beam irradiator and the center line of the capturer runs to cross the rotational axis of the supporting shaft.

Even when the capturer is rotated along with the beam irradiator, a 3D position of the object may be measured with high accuracy due to the slope of the beam projected on the object. The mutual positional relationship between the capturer and the beam irradiator is not changed, so the calculation of 3D measurement may be simplified.

The beam irradiator of the 3D measuring device may include a slit provided in parallel with a rotational axis of the supporting shaft for spreading the beam, and the beam irradiator and the capturer may be arranged such that a baseline connecting a centerline of the beam irradiator and a centerline of the capturer intersects the rotational axis of the supporting shaft.

In this case, even when the capturer is rotated along with the beam irradiator, a 3D position of the object may be measured with high accuracy due to the slope of the baseline.

The 3D measuring device may further include a position sensor for obtaining position information of the supporting shaft, and the at least one processor may obtain the 3D shape of the object based on the image information and the position information of the supporting shaft.

The light source of the beam irradiator may include a semiconductor laser. Accordingly, the beam irradiator may be provided at low cost. The semiconductor laser is suitable for the heating cooker because of its superior heat-resistance.

Furthermore, the at least one processor may control the beam irradiator to change the wavelength of the beam depending on the color of the object. This may enable irradiation of a beam of proper color corresponding to the color of the object when the object has multiple colors. Accordingly, highly accurate 3D measurement is possible.

The disclosure also provides a heating cooker for automatically cooking food by heating.

According to another embodiment of the disclosure, a heating cooker includes a main body, a cooking room arranged inside the main body for receiving an object, a heating device for heating the object, a window arranged on one side of the cooking room, a measuring device arranged outside the cooking room to face the object through the window, and at least one processor configured to control the measuring device to obtain a three dimensional (3D) shape of the object and control the heating device to heat the object based on the 3D shape of the object.

The measuring device included in the heating cooker is the same as the aforementioned 3D measuring device.

According to an embodiment of the heating cooker, the size and shape of a food item may be measured using the measuring device during cooking by heating. Accordingly, advanced cooking is automatically and appropriately performed by taking into account the shape and size of each food item.

The measuring device may include a surface temperature sensor arranged at the supporting shaft for obtaining surface temperature information of the object as the supporting shaft is rotated, and the at least one processor may control the heating device based on the 3D shape and the surface temperature information of the object.

The at least one processor may determine internal temperature of the object based on the 3D shape and the surface temperature information of the object, and control the heating device based on the surface temperature information and the internal temperature.

The at least one processor may determine a type of the object based on the image information and select a heating level corresponding to the type of the object.

More advanced automatic cooking is possible as cooking is performed based on the changing surface temperature of the food item. Furthermore, related devices may be implemented in individual units, thereby allowing the heating cooker to be more compact. The device costs may be saved, so the overall cost may be further reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 9 schematically illustrates a measuring device, according to another embodiment of the disclosure.

DETAILED DESCRIPTION

Figure 1:
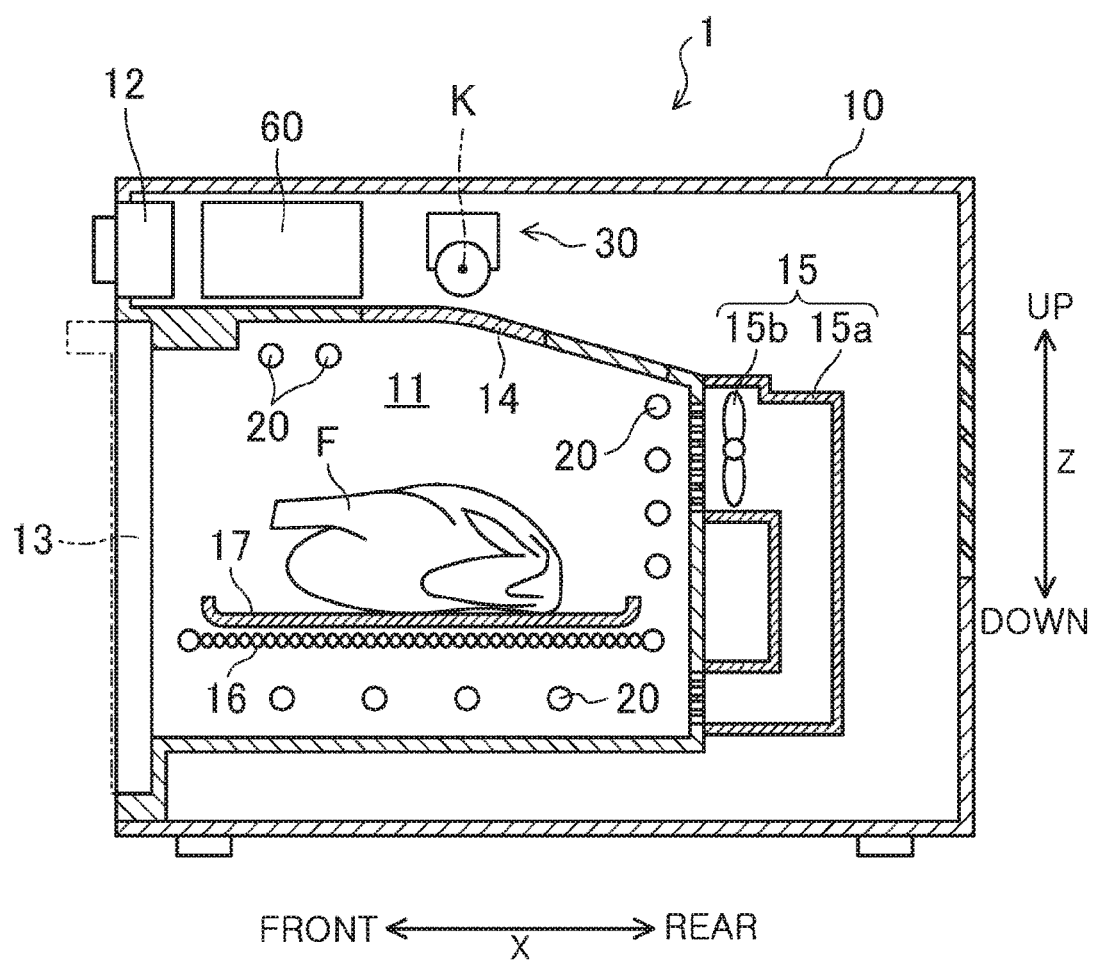
FIG. 1 schematically illustrates a main structure of a heating cooker, according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described in detail with reference to accompanying drawings. The embodiments are merely examples, without being limited thereto. Arrows shown in the drawings represent directions of use in the following description. Specifically, direction X corresponds to a front-back direction, Y corresponds to a horizontal (or left-right) direction, and Z corresponds to a vertical (or up-down) direction.

FIG. 1 illustrates a heating cooker 1, according to an embodiment of the disclosure. A measuring device according to embodiments of the disclosure is installed in the heating cooker 1.

The heating cooker 1 may be a so-called oven. The heating cooker 1 includes a box-shaped main body 10 (also called a case or housing), and a cooking room 11 with an open front formed inside the main body 10. Furthermore, a heater (also called a heating device) 20, a measuring device 30, a controlling device 60, etc., are arranged inside the main body 10.

An operator 12, such as a switch or a monitor is installed on the upper front of the main body 10 for the user to operate the heating cooker 1. The measuring device 30 includes a three dimensional (3D) measuring device, a surface temperature measuring device, or the like, to which a technology according to the disclosure is applied. This will be described in more detail later.

A door 13 that may be opened or closed is provided at the main body 10 on the front of the cooking room 11. A window 14 is provided on one side of the cooking room 11. Specifically, the window 14, which may be transparent, may be provided on a portion of a wall that is a ceiling of the cooking room 11. The window 14 may be formed of transparent heat-resistant glass with superior transmittance.

An air circulation device 15 including a duct 15a and a fan 15b is installed behind the cooking room 11. The duct 15a is installed to be linked to upper and lower portions of the cooking room 11. The fan 15b is installed at the upper position in the duct 15a, and controlled by the controlling device 60. As the fan 15b is driven, air inside the cooking room 11 is circulated. The air circulation device 15 constitutes a heating device. The air circulation device 15 as shown in FIG. 1 is merely an example, and the structure thereof may vary by specifications.

A cooking rack 16 formed with iron net or a cross-striped member is installed inside the cooking room 11. The cooking rack 16 is supported by the left and right sides of the cooking room 11. The top surface of the cooking rack 16 is provided as a plane extending in the front-back X and left-right Y directions, and serves as a reference surface for the measuring device 30.

The plurality of heaters 20 are installed inside the cooking room 11 across the ceiling, bottom and back surfaces of the cooking room 11. It is possible to control the heaters 20 individually, and the heaters 20 heat a food item F (also called an object). The structure and arrangement of the cooking rack 16 and heaters 20 are merely an example, and may vary by specifications.

The heating cooker 1 includes a tray 17 on which to load the food item F. The tray 17 is formed of a metal substance with superior heat conductivity. With the tray 17 placed on the cooking rack 16 in a cooking process by heating, the food item F is placed at a preset cooking position. It is not necessary to have the tray 17 for cooking. Food item F can be placed in the preset cooking position.

The controlling device 60 is installed in an upper portion of the inside of the main body 10. The controlling device 60 controls general operation of the heating cooker 1. The controlling device 60 may include hardware such as a control processing unit (CPU), a memory, an interface, etc., and software such as a control program, various kinds of data, etc. A processor 60a included in the controlling device 60 may create control signals to control operation of the heating cooker 1 based on a control program and data stored in a memory 60b. The processor 60a and the memory 60b may be implemented in separate chips or in a single chip. Furthermore, the controlling device 60 may include more than one processor 60a and more than one memory 60b.

Figure 2:
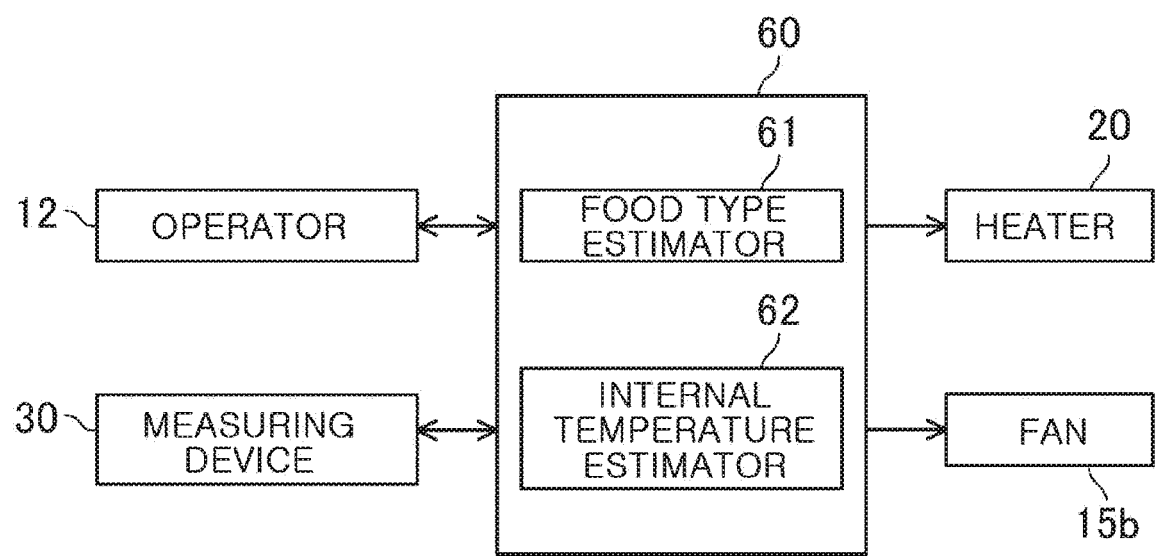
FIG. 2 illustrates a block diagram representing relations between a controlling device and mainly related devices.

FIG. 2 represents relations between the controlling device 60 and mainly related devices. The controlling device 60 is electrically connected to the operator 12, the measuring device 30, the heater 20, and the fan 15b. The controlling device 60 may receive or output information from or to the operator 12, the measuring device 30, etc., and control operations of the heater 20 and the fan 15b. The controlling device 60 includes a food type estimator 61, an internal temperature estimator 62, etc. This will be described in more detail later.

The measuring device 30 is arranged in an upper portion of the inside of the main body 10 near the cooking room 11 to face the food item F placed in the cooking position inside the cooking room 11 through the window 14.

As shown in FIG. 1, the measuring device 30 is placed at a certain distance from the top surface of the cooking rack 16 in the vertical direction Z. The measuring device 30 is installed in the main body 10 to have rotational axis K run parallel to the top surface of the cooking rack 16 in the left-right direction Y.

Figure 3:
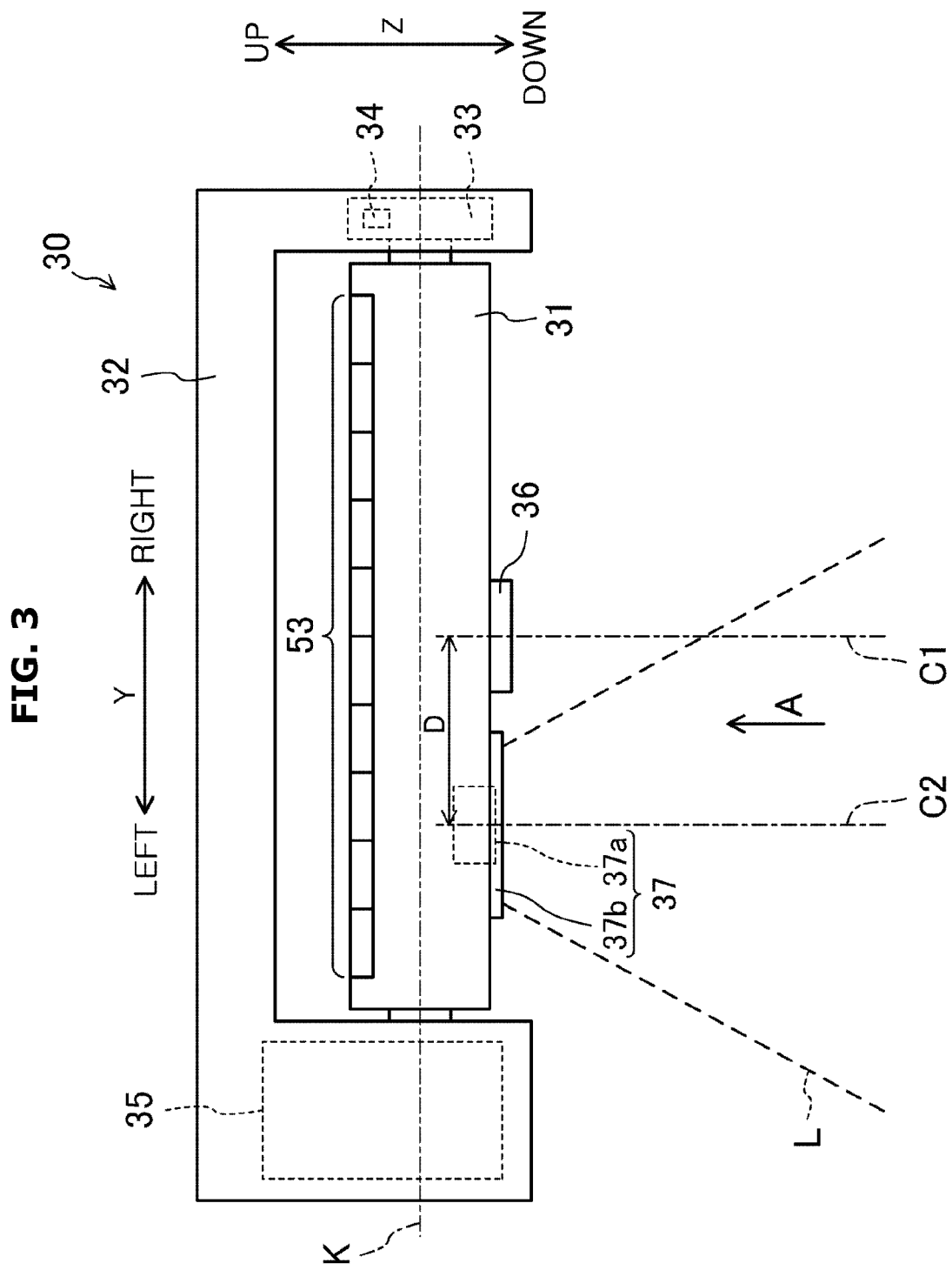
FIG. 3 schematically illustrates a main structure of a measuring device, according to an embodiment of the disclosure.

FIG. 3 illustrates a main structure of the measuring device 30. The measuring device 30 may be a 3D measuring device to which technologies of the disclosure are applied.

Specifically, the measuring device 30 includes a supporting shaft 31 and a supporting frame 32. The supporting shaft 31 is formed with a substantially cylindrical member, and both ends of the supporting shaft 31 are rotationally supported by the supporting frame 32. The supporting shaft 31 includes a motor 33 installed at the supporting frame 32. The supporting shaft 31 is rotated around the rotational axis K as the motor 33 is driven. Furthermore, a position sensor 34 is installed at the supporting frame 32 to measure a rotational position of the supporting shaft 31.

A controller 35 may be installed at the supporting frame 32 to control general operation of the measuring device 30. Like the controlling device 60, the controller 35 may include hardware such as a CPU, a memory, an interface, etc., and software such as a control program, various kinds of data, etc. The controller 35 may include more than one processor and more than one memory.

Figure 4:
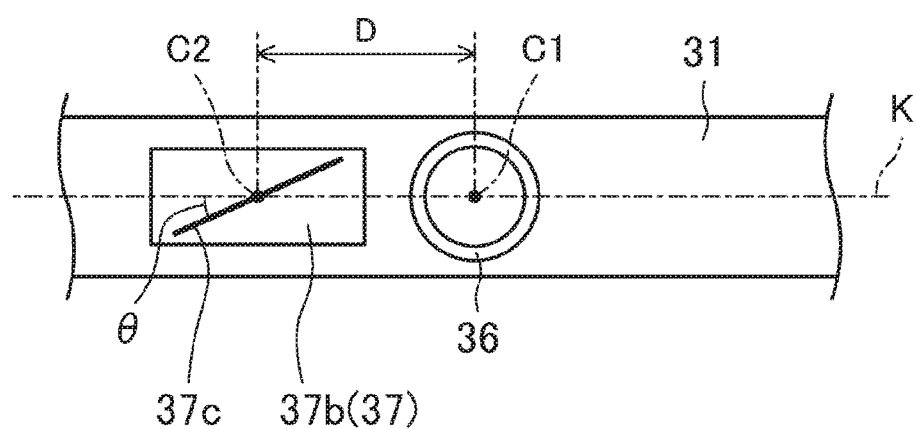
FIG. 4 schematically illustrates the main structure of the measuring device viewed from direction A of an arrow shown in FIG. 3.

A capturer 36 and a beam irradiator 37, which are the main components of the 3D measuring device, are installed on the supporting shaft 31. As shown in FIGS. 3 and 4, the capturer 36 and the beam irradiator 37 are arranged at a preset distance D from each other along the rotational axis K.

The capturer 36 and the beam irradiator 37 are installed at predefined positions on the same supporting shaft 31, so the positional relationship between the capturer 36 and the beam irradiator 37 is stable and remains highly accurate. Furthermore, the capturer 36 and the beam irradiator 37 are arranged along the rotation axis K, so that the positional relationship remains stable even when the supporting shaft 31 is rotated. The capturer 36 and the beam irradiator 37 may be easily assembled into the main body 10, and may be uniformly arranged at proper positions.

As the capturer 36 is rotated, it may capture a wide range even with a narrow image angle. Image distortion may be suppressed, so the accurate measurement is possible.

The capturer 36 may include a mini camera that may capture visible rays. The capturer 36 is arranged substantially in the middle of the length of the supporting shaft 31. The capturer 36 is arranged such that line C1 passing the center of capturing of the capturer 36 passes the rotational axis K and runs orthogonal to the rotational axis K. The focal distance and image angle of the capturer 36 are set for the capturer 36 to capture the entire range of the tray 17 and the food item F (object to be measured) placed on the cooking rack 16 in the left-right direction.

To automatically estimate the type of the food item F, in an embodiment of the disclosure, the capturer 36 serves as a device (an item capturing device) for capturing the food item F alone placed at the cooking position and outputting the image information to the controlling device 60.

The beam irradiator 37 includes a semiconductor laser 37a, an optical element 37b, etc. The semiconductor laser 37a irradiates visible rays of predefined wavelength as a light source of the beam irradiator 37. The optical element 37b is formed of a resin with superior heat-resistance. Accordingly, the beam irradiator 37 may be simply provided with low-cost parts. The beam irradiator 37 is suitable for the heating cooker 1 because it does not require an expensive part vulnerable to heat.

The beam irradiator 37 is configured to be able to change the wavelength of beam L to be irradiated. For example, in an embodiment of the disclosure, the beam irradiator 37 may irradiate red, blue, or any other color beam. For example, there may be a plurality of semiconductor lasers that irradiate different colors of beam, or there may be a tool included in the optical element 37b, which changes the wavelength.

The optical element 37b includes a slit 37c through which the beam L irradiated by the semiconductor laser 37a passes. Accordingly, the beam irradiator 37 changes and outputs visible rays irradiated by the semiconductor laser 37a into a predefined pattern. Specifically, the beam irradiator 37 irradiates the beam L in the form of a plane beam that radially spreads toward the food item F. The line C2 passing an irradiation center of the beam irradiator 37 passes the rotational axis K and runs orthogonal to the rotational axis K. The distance D refers to a distance between the center of capturing C1 and the irradiation center C2, and is called parallax or baseline length.

Furthermore, in the measuring device 30 (or 3D measuring device), as shown in FIG. 4, the slit 37c is sloped from the rotational axis K such that the beam L irradiated by the beam irradiator 37 intersects the rotational axis K and spreads at inclined angles. In other words, the beam L irradiated from the beam irradiator 37 to the food item F has a horizontal component to the rotational axis K and a vertical component to the baseline (here, corresponding to the rotational axis K).

This makes it possible to measure a 3D position of the food item F according to the principle of triangulation even when the capturer 36 is rotated along with the beam irradiator 37. In other words, even when the capturer 36 and the beam irradiator 37 are rotated, the mutual positional relationship between the capturer 36 and the beam irradiator 37 remains the same, thereby making it possible to perform measurement with simple calculation and high accuracy.

An angle (or inclined angle θ) formed between the rotational axis K and the ray L may be properly set, especially to be large. For example, the inclined angle θ may be in a range of 45°±20°.

In this case, the beam L may not always slope down from the rotational axis K. For example, when the baseline S connecting the capturer 36 to the beam irradiator 37 intersects the rotational axis K at an angle even while the beam L spreads in almost parallel to the rotational axis K, the 3D position of the food item F may be measured according to the principle of triangulation even when the capturer 36 is rotated along with the beam irradiator 37.

Figure 5A:
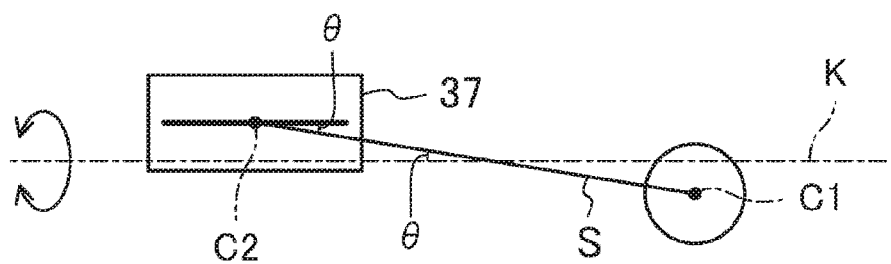
FIG. 5A illustrates a diagram for explaining a principle of a three dimensional (3D) measuring process.
Figure 5B:
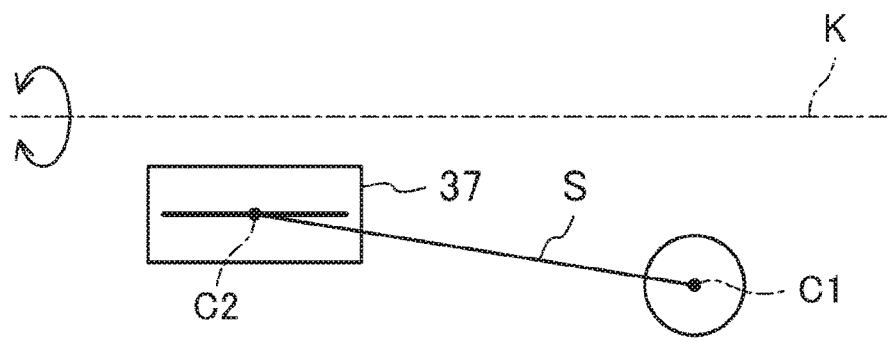
FIG. 5B illustrates a diagram for explaining a principle of a 3D measuring process.

Specifically, as shown in FIGS. 5A and 5B, the capturing center line C1 and the irradiation center line C2 may be out of the rotational axis K. The baseline S connecting the capturing center line C1 and the irradiation center line C2 may intersect the rotational axis K at an angle. Even when the beam L is almost parallel to the rotational axis K, the 3D position of the food item F may be measured according to the principle of triangulation.

Figure 5C:
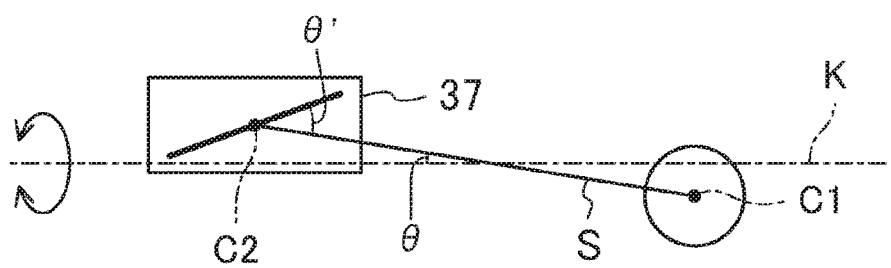
FIG. 5C illustrates a diagram for explaining a principle of a 3D measuring process.

Furthermore, as shown in FIG. 5C, even when the beam L and the baseline S are not parallel to each other and not parallel to the rotational axis K, the parallax may be obtained, and the 3D position of the food item F may be measured according to the principle of triangulation.

Figure 6A:
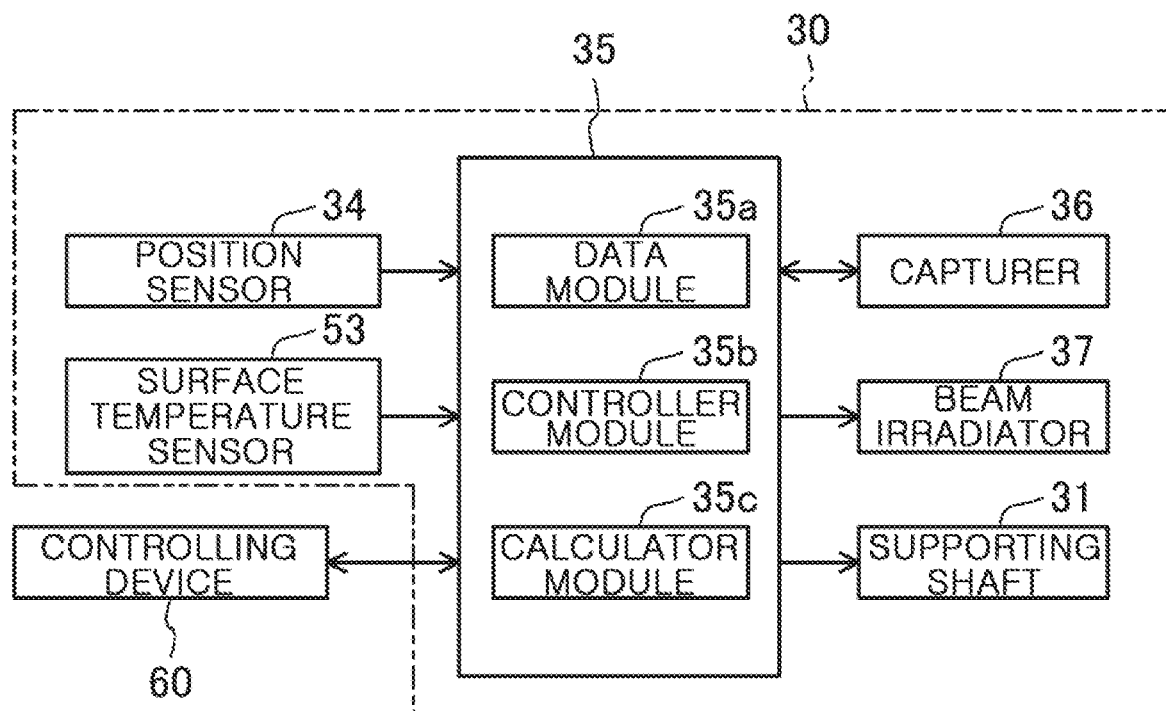
FIG. 6A illustrates a block diagram representing relations between a controller and mainly related devices.
Figure 6B:
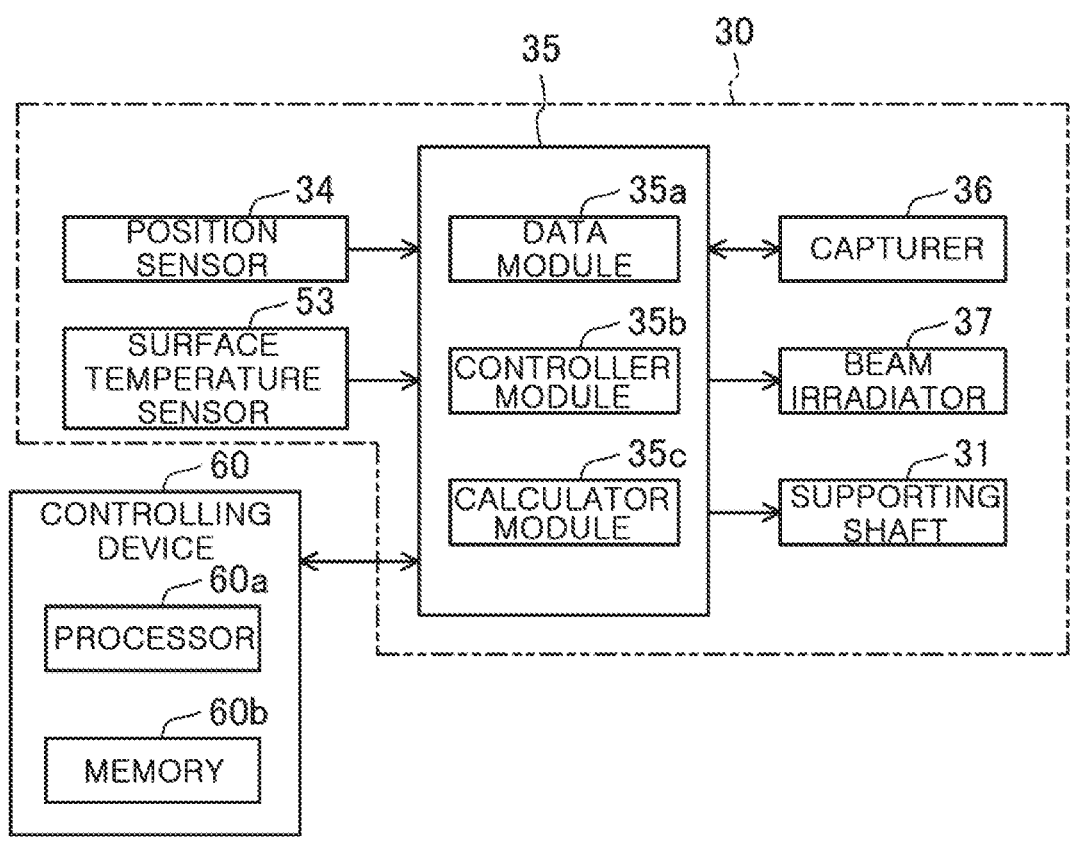
FIG. 6B illustrates a block diagram representing relations between a controller and mainly related devices.

As shown in FIGS. 6A and 6B, the beam irradiator 37, the capturer 36, and the supporting shaft 31 are electrically connected to one another. The controller 35 is electrically connected to the position sensor 34, a surface temperature sensor 53 as will be described later, the controlling device 60, etc., in addition to the beam irradiator 37, the capturer 36, and the supporting shaft 31.

The controller 35 receives or outputs signals from or to the controlling device 60 and the capturer 36. The controller 35 receives signals from the position sensor 34 and the controlling device 60 and outputs signals to the beam irradiator 37 and the supporting shaft 31. Although the controller 35 and the controlling device 60 are shown separately, they may be implemented in a device.

The controller 35 includes a data module 35a, a controller module 35b, and a calculator module 35c. The data module 35a stores a calculation program carried out by the calculator module 35c and data such as a map that is used for calculation by the calculator module 35c. The controller module 35b controls operations of the capturer 36, the beam irradiator 37, and the supporting shaft 31 based on signals received from the position sensor 34 or the controlling device 60. The controller module 35b and the calculation module 35c may be implemented as processors.

The calculator module 35c obtains information (shape information) relating to a 3D shape of the food item F based on a signal (image information) received from the capturer 36, in conjunction with the data module 35a. The controller 35 outputs the image information captured by the capturer 36 and the shape information obtained by the calculator module 35c to the controlling device 60.

In the measuring device 30, the supporting shaft 31 is rotated and the capturer 36 captures the beam L projected by the beam irradiator 37 onto the food item F. The controller 35 calculates and measures a 3D shape of the food item F based on images captured by the capturer 36.

Figure 7:
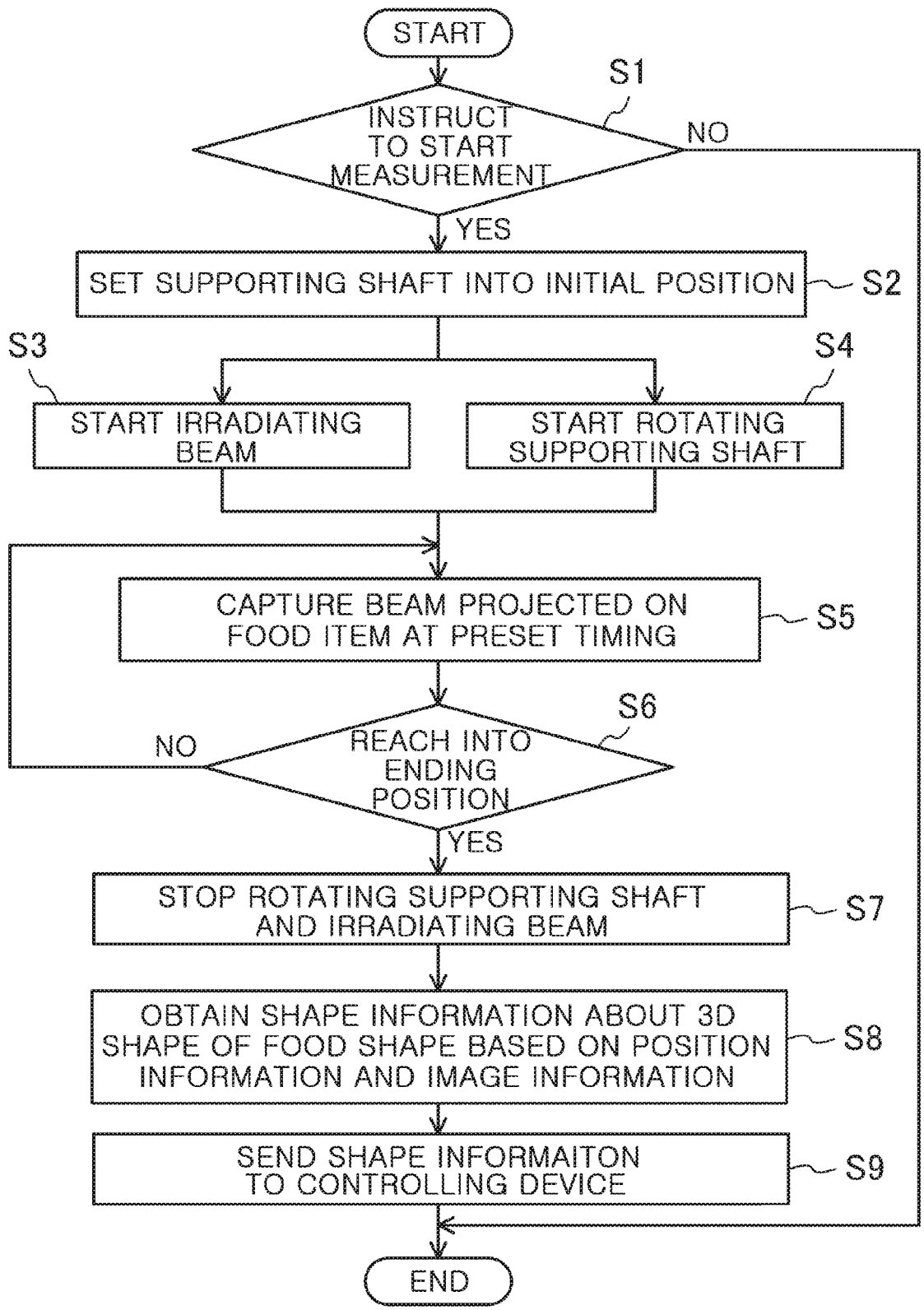
FIG. 7 illustrates a flowchart illustrating a 3D measuring process.
Figure 8A:
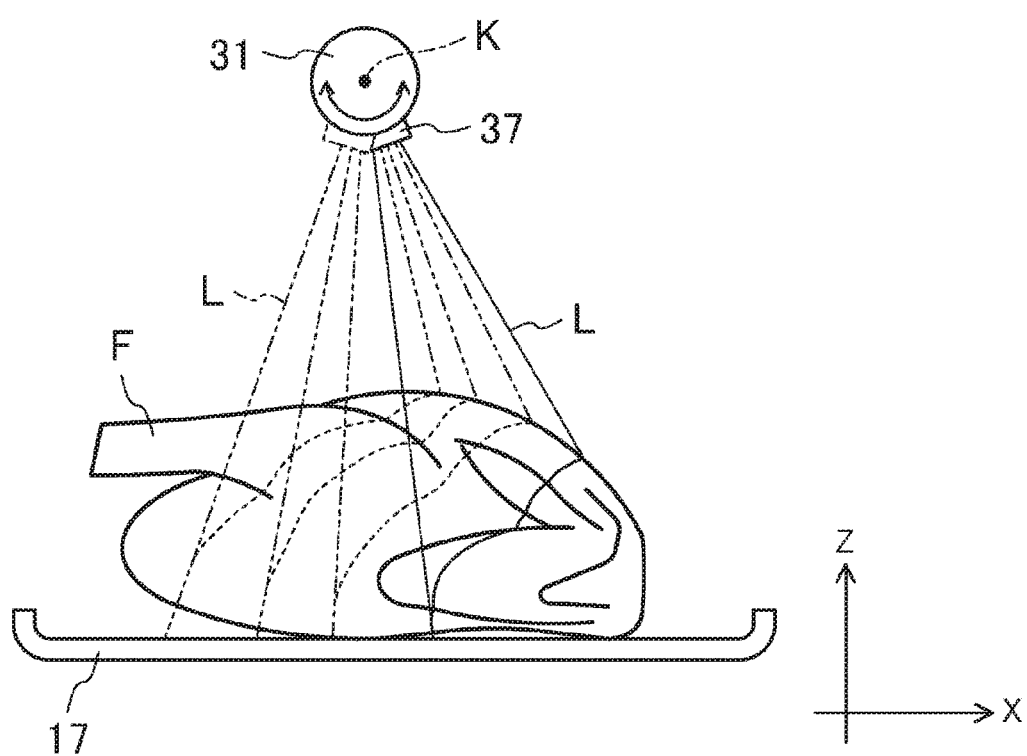
FIG. 8A schematically illustrates a procedure of a 3D measuring process.
Figure 8B:
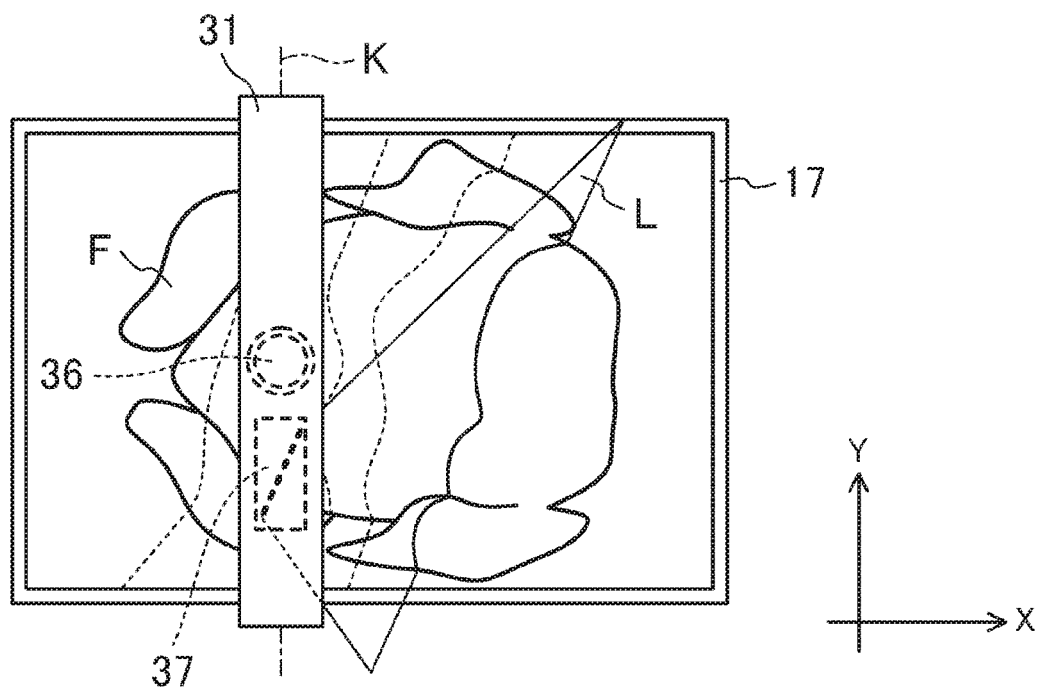
FIG. 8B schematically shows a procedure of a 3D measuring process.

FIG. 7 illustrates a flowchart illustrating a 3D measuring process. Referring to FIGS. 8A and 8B, a 3D measuring process will be described in detail.

When a signal to instruct 3D measurement is received by the controller 35 from the controlling device 60 in S1, the controller 35 (or the controller module 35b) controls the supporting shaft 31 to be rotated into an initial position based on the position information received from the position sensor 34 in S2. The controller 35 rotates the supporting shaft 31 for the beam L irradiated by the beam irradiator 37 to scan the entire range above the cooking rack 16 in the front-back direction X. The initial position is a preset angular position of the supporting shaft 31 that is a starting point of scanning.

In this case, the controller 35 changes the wavelength of the irradiated ray L by controlling the beam irradiator 37 when receiving a predefined instruction from the controlling device 60. As the food item F has multiple colors, it may be difficult to identify the beam L projected onto the food item F due to color mixing. Hence, in an embodiment of the disclosure, the heating cooker 1 irradiates the beam L of a proper color by changing the wavelength of the beam L depending on the color of the food item F as needed. This may enable very accurate 3D measurement to be performed.

When the supporting shaft 31 is set into the initial position, the controller 35 controls the beam irradiator 37 to start irradiating the beam L, in S3. The supporting shaft 31 is rotated at a preset speed, in S4.

As shown in FIGS. 8A and 8B, as the beam L is set up to intersect the rotational axis K and spread at inclined angles, projected lines are formed on the surface of the food item F to be inclined in both the X and Y directions. The controller 35 controls the capturer 36 to capture the beam L projected onto the food item F at predefined timings, in S5.

When obtaining image information captured by the capturer 36, the controller 35 temporarily stores the image information in the data module 35a in relation to position information received from the position sensor 34. When the beam L scans the entire range above the cooking rack 16 and the supporting shaft 31 reaches into a preset ending position in S6, the controller 35 stops rotating the supporting shaft 31 and simultaneously, stops irradiating the ray L from the beam irradiator 37 in S7.

The controller 35 measures the 3D shape of the food item F based on the position information and the image information stored in the data module 35a, in S8. Specifically, the controller 35 calculates height from the surface of the tray 17 to the surface of the food item F based on the principle of triangulation.

The controller 35 uses the distance D, i.e., the parallax or the baseline between the capturer 36 and the beam irradiator 37 to calculate the 3D position of the beam L projected on various places on the surface of the food item F from the plurality of pieces of image information captured. How to calculate the 3D position is known to those of ordinary skill in the art, so the detailed description thereof will be omitted.

Consequently, 3D position information for several places on the surface of the food item F may be obtained. Those pieces of the 3D position information are intermittent, but the overall 3D position information, i.e., the shape information, of the surface of the food item F may be obtained by a process of e. G., linear interpolation. From the shape information, the position, volume, and shape of the food time F may be estimated.

At this time, for example, a map for simplifying the calculation of the 3D measurement process may be used. Specifically, a map or a table that digitizes mathematical equations or compensation values used in the calculation of 3D position from the image information may be preset and used in the 3D measurement process. This may simplify the calculation process as compared with calculation that uses the mathematical equations or compensation values directly.

When obtaining the shape information of the food item F, the controller 35 outputs the shape information to the controlling device 60, in S9.

The measuring device 30 may serve as a surface temperature measuring device as mentioned above.

As illustrated in FIG. 3, in an embodiment of the disclosure, the surface temperature measuring device includes the supporting shaft 31, the plurality of surface temperature sensors 53, and the controller 35.

Each surface temperature sensor 53 corresponds to a non-contact temperature sensor and is installed on the supporting shaft 31. Not to interfere with the capturer 36 and the beam irradiator 37, the surface temperature sensors 53 may be arranged almost opposite the capture 36 and the beam irradiator 37. The surface temperature sensors 53 are arranged in series in the left-right direction in which the supporting shaft 31 extends.

For measuring the surface temperature of the food item F, the controller 35 rotates the supporting shaft 31 for the surface temperature sensor 53 to scan the entire area above the cooking rack 16 in the front-back direction X.

The controller 35 sets the supporting shaft 31 into an initial position to start scanning based on the signal received from the position sensor 34. Similar to the 3D measurement occasion, the controller 35 controls the supporting shaft 31 to start rotating at a preset speed. The controller 35 obtains temperature information from the surface temperature sensor 53 at predefined timings, and temporarily stores the temperature information in the data module 35a in relation to the position information received from the position sensor 34.

When the surface temperature sensor 53 scans the entire range above the cooking rack 16 and the supporting shaft 31 reaches into a preset ending position, the controller 35 stops rotating the supporting shaft 31.

The surface temperatures of the food item F and the tray 17 are measured in fragments by each of the surface temperature sensors 53. The controller 35 performs a statistical process such as linear interpolation to obtain two dimensional (2D) surface temperature and outputs the surface temperature to the controlling device 60.

The food type estimator 61 estimates a type of the food item F placed in the cooking position based on the image of the food item F captured by the capturer 36. Specifically, the controlling device 60 sends a signal to the controller 35 for the capturer 36 to capture the food item F before cooking by heating is started. The controller 35 then controls the supporting shaft 31 to be rotated and the capturer 36 to capture the food item F, and sends the image information to the controlling device 60.

The controlling device 60 stores information in advance about various item images placed in the cooking position. The food type estimator 61 compares the information with the image information captured by the capturer 36. Similarity between them is statistically determined. The food type estimator 61 estimates an item with highest similarity as the type of the food item F.

Furthermore, the controlling device 60 stores heating levels corresponding to various types of food items in a database. The controlling device 60 selects a heating level optimized to the estimated type of the food item F from the database.

The internal temperature estimator 62 estimates internal temperature of the food item F based on the shape information and the surface temperature information. Specifically, the controlling device 60 specifies a portion of the food time F (normally a portion normally the most difficult for the temperature to rise), whose internal temperature is to be estimated, based on the shape information before the cooking process by heating is started.

The controlling device 60 sends an instruction signal to the controller 35 to measure the surface temperature of the food item F during the time the cooking process by heating is performed. Simultaneously, based on the surface temperature of the food item F, the internal temperature of the specified portion is estimated by a heat conductivity model equation corresponding to the food item F.

The controlling device 60 controls operations of the heater 20 and the fan 15b based on a temporary change in each of the measured surface temperature of the food item F and the calculated internal temperature of the food item F, while keeping the heating phase. The controlling device 60 performs cooking by heating while properly changing the heating level. Accordingly, with the heating cooker 1 in an embodiment of the disclosure, different sizes and shapes of food item F may be cooked conveniently and tasty without need for particular skill of the user.

FIG. 9 schematically illustrates a measuring device, according to another embodiment of the disclosure.

A basic structure of a measuring device 40 is the same as that of the measuring device 30 in the previous embodiment of the disclosure. Like reference numerals are used to refer to like elements having the same functions, and description thereof will be omitted or simplified.

The supporting shaft 31 is formed with a cylindrical member. A flange 41 is provided at an end of the supporting shaft 31, and the supporting shaft 31 is supported by the supporting frame 32 to be able to rotate through the flange 41. The controller 35 is not shown in FIG. 9.

The surface temperature sensor 53 is installed on the supporting shaft 31 between the capturer 36 and the beam irradiator 37 for detecting the surface temperature at an wide angle.

The supporting shaft 31 extends almost parallel to the rotational axis K at a certain distance from the rotational axis K. The capturer 36 and the beam irradiator 37 are rotated at a certain radius around the rotational axis K. Accordingly, the measuring device 40 may rotate the supporting shaft 31 to a large circle with small torque of the motor 33.

Furthermore, the 3D measuring device according to the disclosure is not limited to the aforementioned embodiments and may include other various components.

Although the above embodiments illustrate an occasion when the 3D measuring device is applied to heating cookers, the 3D measuring device may be applied to various devices other than the heating cookers. The structure of the heating cooker 1 is merely an example. The structure of the measuring device 30 may not be fixed but changed within the scope of the disclosure as needed.

3D measurement of the food item F may be performed over a particular position without scanning entire area of the food item F. For example, as for steak having uniform thickness, it is sufficient to measure the thickness regardless of the size, so the measuring process becomes simple.

According to the disclosure, a compact 3D measuring device that is able to measure even a large object may be proved at low cost, and may be available in a heating cooker. As a result, food items in various shapes and sizes may be appropriately heated and cooked by simple button manipulation, thereby realizing advanced automation of heating cookers.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A heating cooker comprising:
a main body;
a cooking room arranged inside the main body and configured to receive a food item;
a heater configured to heat the food item;
a window arranged on one side of the cooking room;
a measuring device arranged outside the cooking room and inside the main body, facing the food item through the window; and
at least one processor configured to control the measuring device to obtain a three dimensional (3D) shape of the food item and control the heater to heat the food item based on the 3D shape of the food item,
wherein the measuring device comprises:
a supporting shaft that is rotatable along a rotational axis that extends through a center of a circular cross section of the supporting shaft;
a supporting frame configured to rotatably support both ends of the supporting shaft between the supporting frame;
a beam irradiator arranged at the supporting shaft and configured to irradiate a beam of light onto the food item, wherein the beam irradiator comprises a slit provided with a set angle of 45°±20° from the rotational axis of the supporting shaft and configured to spread the beam, the slit provided to be inclined with respect to the rotation axis of the supporting shaft so that the beam intersects the rotation axis of the supporting shaft and spreads in an inclined direction;
a capturer arranged at the supporting shaft to be at a distance from the beam irradiator and configured to capture the beam projected on the food item; and
a position sensor installed on the supporting frame and configured to obtain position information of the supporting shaft,
wherein a positional relationship between the beam irradiator and the capturer remains the same even when the supporting shaft rotates, and
wherein the at least one processor is configured to control rotation of the supporting shaft based on the obtained position information and obtain the 3D shape of the food item based on image information obtained by the capturer as the supporting shaft is rotated.

2. The heating cooker of claim 1, wherein:
the measuring device further comprises a surface temperature sensor arranged at the supporting shaft and configured to obtain surface temperature information of the food item as the supporting shaft is rotated, and
the at least one processor is further configured to control the heater based on the 3D shape and the surface temperature information of the food item.

3. The heating cooker of claim 2, wherein the at least one processor is further configured to:
determine internal temperature of the food item based on the 3D shape and the surface temperature information of the food item; and
control the heater based on the surface temperature information and the internal temperature.

4. The heating cooker of claim 1, wherein the at least one processor is further configured to:
determine a type of the food item based on the image information; and
select a heating level corresponding to the type of the food item.

5. The heating cooker of claim 1, wherein the beam irradiator and the capturer are arranged such that a baseline connecting a centerline of the beam irradiator and a centerline of the capturer is parallel to the rotational axis of the supporting shaft.

6. The heating cooker of claim 1, wherein
the at least one processor is configured to obtain the 3D shape of the food item based on the image information and the position information of the supporting shaft.

7. The heating cooker of claim 1, wherein the at least one processor is further configured to control the beam irradiator to change wavelength of the beam depending on color of the food item.

8. The heating cooker of claim 1, wherein the beam irradiator comprises a semiconductor laser as a light source.

* * * * *